2 Sheets--Sheet 1.

W. W. TREVOR.
Machine for Making Barrel-Heads.

No. 166,041.  Patented July 27, 1875.

WITNESSES:
C. Neveux
A. F. Terry

INVENTOR:
W. W. Trevor
BY
ATTORNEYS.

W. W. TREVOR.
Machine for Making Barrel-Heads.
No. 166,041. Patented July 27, 1875.
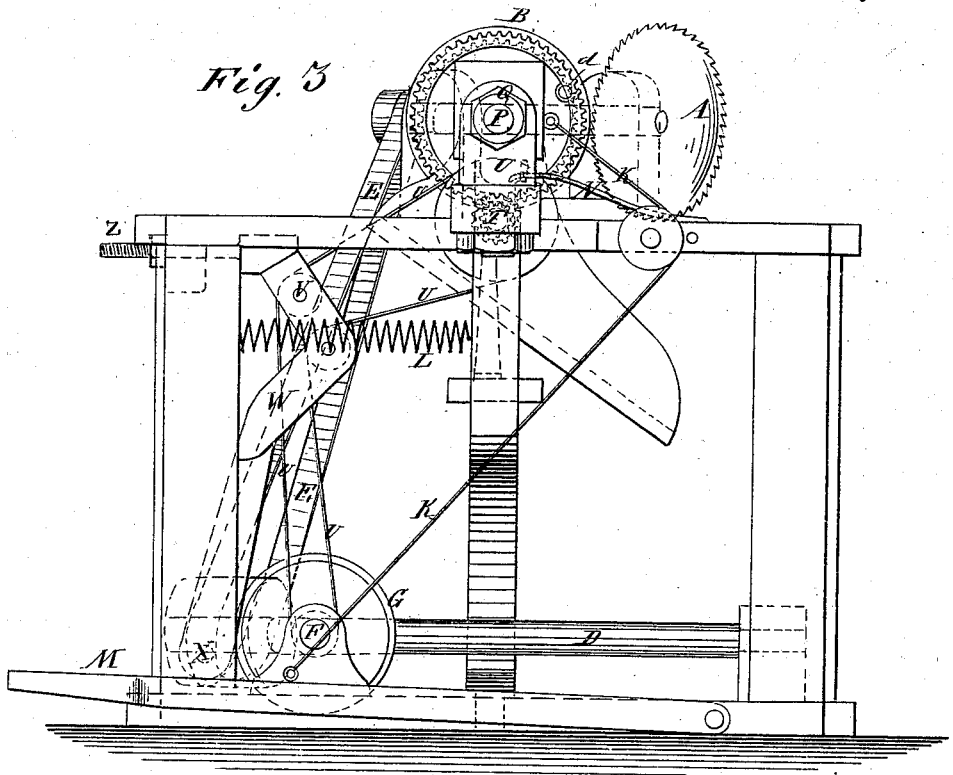
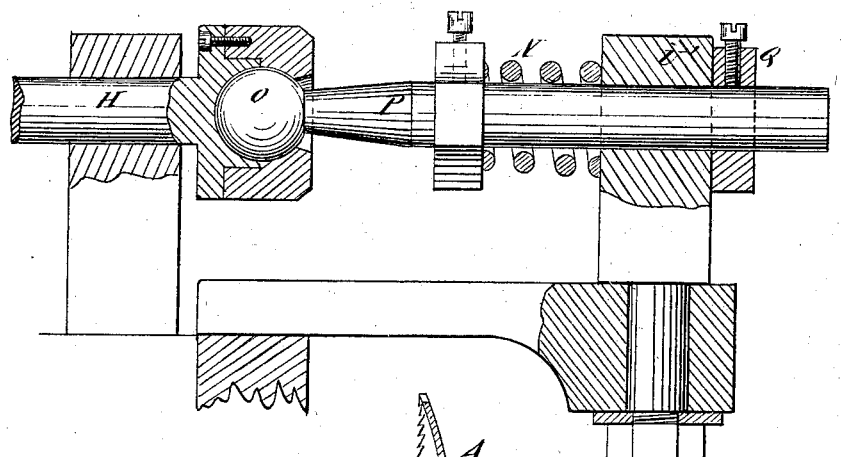
WITNESSES:
C. Neveux
A. F. Terry
INVENTOR:
W. W. Trevor
BY
Munn & Co
ATTORNEYS.

UNITED STATES PATENT OFFICE.

WILLIAM W. TREVOR, OF LOCKPORT, NEW YORK, ASSIGNOR TO HIMSELF AND FRANCIS N. TREVOR, OF SAME PLACE.

IMPROVEMENT IN MACHINES FOR MAKING BARREL-HEADS.

Specification forming part of Letters Patent No. 166,041, dated July 27, 1875; application filed June 19, 1875.

*To all whom it may concern:*

Be it known that I, WILLIAM W. TREVOR, of Lockport, in the county of Niagara and State of New York, have invented an Improvement in Machines for Making Barrel-Heads, of which the following is a specification:

The invention relates to machinery for circling barrel-heads by revolving clamps and a circular saw, the clamps being contrived to move the pieces to be sawed up to the saw, and turn them around one revolution, and then move away at the same time that they open to discharge the finished head; and it consists of the apparatus for gearing the shaft of the clamps with the saw-arbor to turn it thereby; also the apparatus for closing and opening the clamps; also mechanism for starting, stopping, and allowing the clamps to rest for changing the work; and also mechanism for causing the clamps to turn a little more than a revolution at each operation in combination with an automatic stop, to insure the cutting of the complete circle, all as hereinafter described.

Figure 1:
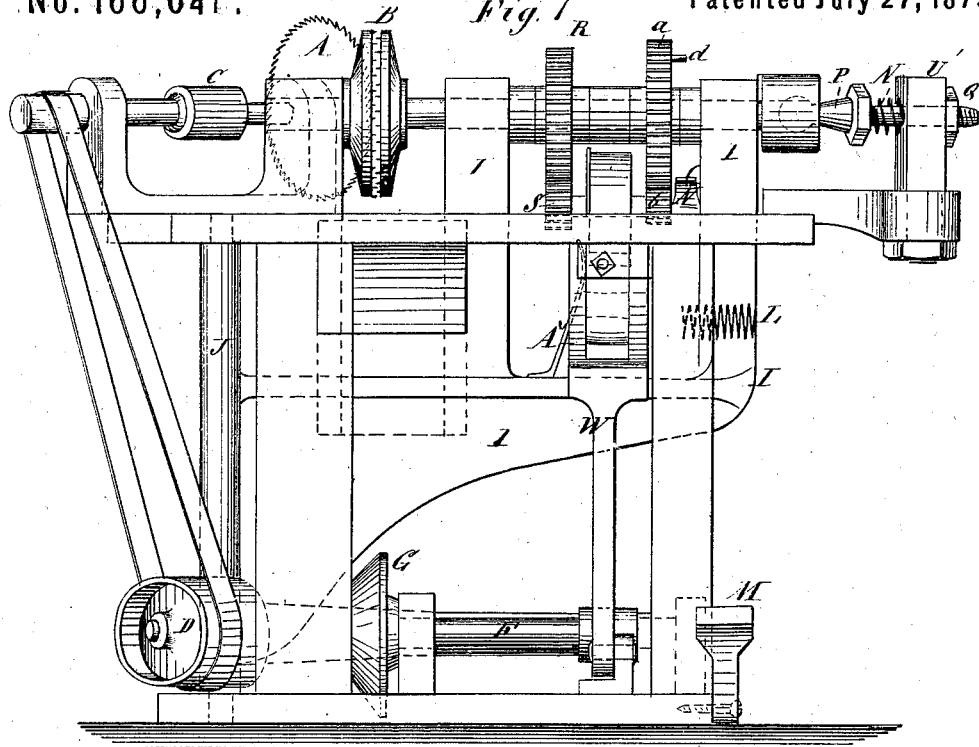
Figure 2:
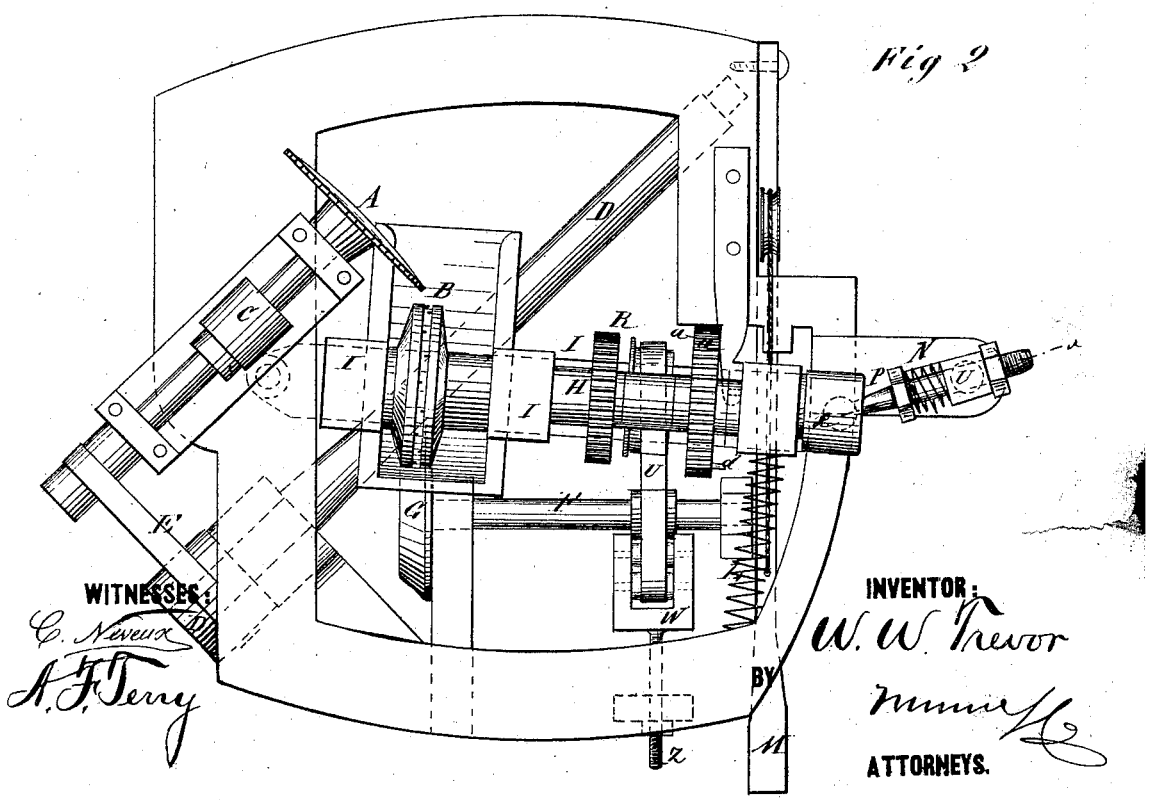

Figure 1 is a front elevation of my improved machine. Fig. 2 is a plan view. Fig. 3 is a side elevation. Fig. 4 is a section on line $x\,x$ of Fig. 2, and Fig. 5 is a section of the saw.

Similar letters of reference indicate corresponding parts.

A is the saw, and B the clamps for holding the work and presenting it to the saw. The saw is driven by a belt from above, working on the pulley C of the arbor, and it runs continuously while the clamps stop after each revolution for changing the work. The saw-arbor turns the counter-shaft D by the belt E, and this shaft turns another shaft, F, by the bevel friction-wheel G. This shaft is parallel to the clamp-shaft H, which is oblique to the saw-arbor, to bevel the edge of the head at the same time that it is sawed to the circle. The shaft of the clamp is mounted in the frame I, which turns on the pivot J, to swing the clamp toward and from the saw, and the frame is connected by cord K with the foot-lever M, so as to swing toward the saw for presenting the work to it, and it has the spring L connected to it for pulling it back. When the frame is swung forward to present the work, the spring-catch N catches and holds it until the head is completed. The shaft H, whereon the clamp which shifts to open and close for securing and releasing the heads is mounted, has a little movement in its lengthwise direction and is coupled by the ball-and-socket joint O with the short bar P, arranged in the turning-standard U', with a spring to push the shaft against the head when it is swung forward on the frame I, which at the same time brings the shaft and the rod P into line with each other. The rod is adjustable by the nut Q, to vary the tension of the spring. The object of pressing the shaft forward by a spring is to have certain elasticity in the clamps, to compensate for irregularities in the thickness in the heading, and also for differences in the density of the wood, which affect the penetration of the points of the clamps in the wood. The clamp-shaft is turned by the wheel R and the pinion S of a short shaft, T, which is turned by the belt U from the counter-shaft F, the said belt being arranged to turn at an angle by the guide-pulleys V, and extend from them to the shaft T, in the direction that the frame swings, so as to slack and let the clamps stop when they swing back from the saw, and to tighten up and set it in motion when they swing toward the saw, thus effecting the stopping and starting of them by the same motions that cause the clamps to swing away from and up to the saw. The frame W is arranged on a joint, X, at the bottom, and is suspended on an adjusting-screw, Z, at the top, for regulating the tension of the belt U. The shaft H carries a loose wheel, $a$, which gears with a pinion, $b$, on the shaft T, and has a stud-pin, $d$, to trip the catch W when the head is completed, to allow the clamps to swing back. This wheel is contrived in respect to the number of its teeth, or those of the pinion which drives it, to run a little slower than the clamp-shaft, so that the latter will make a little more than a full turn before swinging away from the saw, in order that no part of the circle shall be imperfectly cut, as might be if the trip was on wheel R, by reason of its turning a little before coming to its position at starting. A' is a friction spring-brake bearing against the pulley on shaft T, to stop the clamps promptly when the driving-belt U slackens, and prevent them from turning so far as to prevent the cutting of the heads perfectly round. A weight may be employed instead of the spring to hold the brake on the pulley.

Having thus described my invention, I claim as new, and desire to secure by Letters Patent—

1. The combination of a tripping-wheel, $a$, with the clamp-shaft and the trip-catch, the said wheel having slower motion than the clamp-shaft, substantially as specified.

2. The combination of the pinion $b$, and tripping-wheel $a$, with the driving-shaft T, and the clamp-shaft, substantially as specified.

3. The swinging rod P, combined with and jointed to the swinging clamp-shaft H, substantially as specified.

4. The swinging rod P, having lengthwise motion in its support, and the spring N, in combination with the clamp-shaft, substantially as specified.

WILLIAM W. TREVOR.

Witnesses:
C. L. DuQuett,
Geo. S. Trevor.